US012719132B2

(12) United States Patent
Wang et al.

(10) Patent No.: US 12,719,132 B2

(45) Date of Patent: Aug. 25, 2026

(54) BATTERY MODULE, POWER BATTERY, AND VEHICLE

(71) Applicant: SVOLT ENERGY TECHNOLOGY COMPANY LIMITED, Changzhou (CN)

(72) Inventors: Jue Wang, Changzhou (CN); Yanbin Wei, Changzhou (CN); Baichuan Weng, Changzhou (CN); Youngbin Lim, Changzhou (CN); Yong Li, Changzhou (CN); Shudong Xiu, Changzhou (CN); Lifu Bian, Changzhou (CN); Xiaoqing Jia, Changzhou (CN); Yukun Jia, Changzhou (CN)

(73) Assignee: SVOLT ENERGY TECHNOLOGY COMPANY LIMITED, Changzhou (CN)

( * ) Notice: Subject to any disclaimer, the term of this patent is extended or adjusted under 35 U.S.C. 154(b) by 710 days.

(21) Appl. No.: 18/044,375

(22) PCT Filed: Dec. 23, 2021

(86) PCT No.: PCT/CN2021/140934

§ 371 (c)(1),
(2) Date: Mar. 7, 2023

(87) PCT Pub. No.: WO2022/143422

PCT Pub. Date: Jul. 7, 2022

(65) Prior Publication Data

US 2023/0352796 A1 Nov. 2, 2023

(30) Foreign Application Priority Data

Dec. 29, 2020 (CN) ........................ 202011593065.3

(51) Int. Cl.
*H01M 50/30* (2021.01)
*H01M 50/213* (2021.01)
(Continued)

(52) U.S. Cl.
CPC ....... *H01M 50/394* (2021.01); *H01M 50/213* (2021.01); *H01M 50/262* (2021.01); *H01M 50/291* (2021.01); *H01M 50/512* (2021.01)

(58) Field of Classification Search
CPC ............. H01M 50/394; H01M 50/262; H01M 50/291; H01M 50/213; H01M 50/512; H01M 10/0422
See application file for complete search history.

(56) References Cited

U.S. PATENT DOCUMENTS 8,394,525 B2 * 3/2013 Maguire ............... H01M 10/14 429/157
8,557,415 B2 * 10/2013 Herron .................... B60L 58/21 429/185

(Continued)

FOREIGN PATENT DOCUMENTS

CN 105591065 A 5/2016
CN 108448021 A 8/2018

(Continued)

OTHER PUBLICATIONS

Machine Translation of CN-113273024-A (Dec. 2, 2025) (Year: 2025).*

(Continued)

*Primary Examiner* — Matthew J Merkling

(57) ABSTRACT

The present disclosure discloses a battery module, a power battery, and a vehicle. The battery module includes a plurality of cell layers laminated on each other and a fixation bracket. Each cell layer includes a plurality of cells arranged in parallel. Each cell has an explosion-proof opening. For (Continued)

every two adjacent cell layers of the cell layers, more than half the number of the explosion-proof openings in one cell layer face towards a first direction, and more than half the number of the explosion-proof openings in the other one cell layer face towards a second direction. The first direction is different from the second direction. The fixation bracket is located at each of two sides of the cell layers. Each of both ends of each cell is fixed to the fixation bracket that is on a same side as the end.

19 Claims, 5 Drawing Sheets

(51) Int. Cl.

| | |
|---|---|
| ***H01M 50/262*** | (2021.01) |
| ***H01M 50/291*** | (2021.01) |
| ***H01M 50/512*** | (2021.01) |

(56) References Cited

U.S. PATENT DOCUMENTS

| | | | | |
|---|---|---|---|---|
| 2009/0208836 | A1* | 8/2009 | Fuhr | H01M 50/107 429/178 |
| 2016/0028059 | A1* | 1/2016 | Sweney | H01M 10/0525 429/87 |
| 2016/0218336 | A1* | 7/2016 | Herrmann | H01M 50/367 |
| 2018/0034014 | A1* | 2/2018 | Ichikawa | H01M 50/30 |
| 2018/0233723 | A1 | 8/2018 | Morioka | |
| 2018/0287104 | A1* | 10/2018 | Urushihara | H01M 50/188 |
| 2019/0273243 | A1* | 9/2019 | Motokawa | H01M 50/593 |
| 2020/0411823 | A1* | 12/2020 | Heckert | H01M 50/209 |
| 2022/0123428 | A1* | 4/2022 | Wakabayashi | H01M 10/0525 |

FOREIGN PATENT DOCUMENTS

| | | | | | |
|---|---|---|---|---|---|
| CN | 108493364 | A | * | 9/2018 | H01M 10/615 |
| CN | 110707258 | A | | 1/2020 | |
| CN | 111668423 | A | | 9/2020 | |
| CN | 211828977 | U | | 10/2020 | |
| CN | 112635882 | A | | 4/2021 | |
| CN | 213752929 | U | | 7/2021 | |
| CN | 113273024 | A | * | 8/2021 | H01M 50/367 |
| CN | 117678119 | A | * | 3/2024 | H01M 50/271 |
| EP | 3675211 | A1 | | 7/2020 | |

OTHER PUBLICATIONS

Machine Translation of CN-108493364-A (Dec. 2, 2025) (Year: 2025).*

Machine Translation of CN117678119A (Dec. 3, 2025) (Year: 2025).*

Extended European Search Report from corresponding European Application No. EP21914159.5, dated Oct. 30, 2024.

International Search Report dated Mar. 22, 2022 in International Application No. PCT/CN2021/140934. English translation attached.

The Grant Notice from corresponding Chinese Application No. 202011593065.3, dated Apr. 1, 2020. English translation attached.

First Office Action dated Mar. 18, 2026 received in corresponding patent family application No. IN202327003415.

* cited by examiner

BATTERY MODULE, POWER BATTERY, AND VEHICLE

The present application claims priority to Chinese Patent Application No. 202011593065.3 filed on Dec. 29, 2020 and entitled "BATTERY MODULE, POWER BATTERY, AND VEHICLE", the entire disclosure of which is incorporated herein by reference.

TECHNICAL FIELD

The present disclosure relates to the field of vehicle technologies, and more particularly, to a battery module, a power battery, and a vehicle.

BACKGROUND

In the field of vehicle technologies, explosion-proof openings of cells of most battery modules are arranged to face towards a same direction. When thermal runaway occurs in one cell of such a battery module, high-temperature substances ejected from the explosion-proof opening of the cell may be sprayed to other cells towards which the explosion-proof opening faces. The other cells affected by the ejection also spray high-temperature substances to some other cells, resulting in a chain reaction of thermal runaway, and eventually thermal runaway of the entire battery module.

SUMMARY

The present disclosure provides a battery module. The battery module has an advantage of a slight chain reaction after thermal runaway.

The present disclosure provides a power battery. The power battery includes the battery module as described above.

The present disclosure provides a vehicle. The vehicle includes the power battery as described above.

According to an embodiment of the present disclosure, the battery module includes: a plurality of cell layers laminated on each other, each of the plurality of cell layers including a plurality of cells arranged in parallel, and each of the plurality of cells having an explosion-proof opening defined thereon, where for every two adjacent cell layers of the plurality of cell layers, more than half the number of the explosion-proof openings in one of the two adjacent cell layers face towards a first direction, and more than half the number of the explosion-proof openings in the other one of the two adjacent cell layers face towards a second direction, the first direction being different from the second direction; and a fixation bracket located at each of two sides of the plurality of cell layers, where each of both ends of each of the plurality of cells is fixed to the fixation bracket that is on a same side as the end.

With the battery module according to an embodiment of the present disclosure, the cell layer is formed by arranging the plurality of cells in parallel. The plurality of cell layers is laminated on each other. For every two adjacent cell layers of the plurality of cell layers, more than half the number of the explosion-proof openings in one of the two adjacent cell layers face towards the first direction, and more than half the number of the explosion-proof openings in the other one of the two adjacent cell layers face towards the second direction. The first direction is different from the second direction. Therefore, when thermal runaway occurs in a cell in one of any two adjacent cell layers, high-temperature substances ejected from the cell subjected to the thermal runaway slightly affect other cells in the other one of the two adjacent cell layers, thereby reducing a probability of damages to the other cells in the other one of the two adjacent cell layers and a probability of a chain reaction of thermal runaway among cells.

In some embodiments, the first direction is perpendicular to or opposite to the second direction.

In some embodiments, for every two adjacent cell layers, the explosion-proof openings, except for the explosion-proof opening located at an edge, in one of the two adjacent cell layers face towards the first direction; and the explosion-proof openings, except for the explosion-proof opening located at an edge, in the other one of the two adjacent cell layers face towards the second direction.

In some embodiments, in the plurality of cell layers, all the explosion-proof openings in an uppermost cell layer face upwards; and all the explosion-proof openings in a lowermost cell layer face downwards. When the plurality of cell layers includes three cell layers, all the explosion-proof openings in a middle cell layer of the three cell layers face towards a left side or a right side simultaneously. Or when the plurality of cell layers includes four or more cell layers, the explosion-proof openings in any two adjacent cell layers of the four or more cell layers other than an uppermost cell layer and a lowermost cell layer face towards the left side and the right side alternately.

In some embodiments, in the plurality of cell layers, the explosion-proof opening at a leftmost end of an uppermost cell layer faces towards a left side, the explosion-proof opening at a rightmost end of the uppermost cell layer faces towards a right side, and the explosion-proof openings located between the leftmost end and the rightmost end of the uppermost cell layer face upwards; and the explosion-proof opening at a leftmost end of a lowermost cell layer faces towards the left side, the explosion-proof opening at a rightmost end of the lowermost cell layer faces towards the right side, and the explosion-proof openings located between the leftmost end and the rightmost end of the lowermost cell layer face downwards. When the plurality of cell layers includes three cell layers, the explosion-proof opening at a rightmost end of a middle cell layer of the three cell layers faces towards the right side, and the remaining explosion-proof openings in the middle cell layer face towards the left side; or the explosion-proof opening at a leftmost end of the middle cell layer of the three cell layers faces towards the left side, and the remaining explosion-proof openings in the middle cell layer face towards the right side.

In some embodiments, the explosion-proof opening is in an arc shape. The explosion-proof opening is disposed on an end surface of the cell. The explosion-proof opening is offset with respect to a center line of the corresponding cell.

In some embodiments, the plurality of cells is connected to each other through a connection busbar. Each of two longitudinal ends of the connection busbar is in an arc shape to avoid the explosion-proof opening. Each of the two longitudinal ends of the connection busbar has an arcuate outer diameter smaller than or equal to an arcuate inner diameter of the explosion-proof opening to allow at least a part of the ends of the connection busbar to fully or partially avoid the corresponding explosion-proof opening.

In some embodiments, the connection busbar includes a first busbar, a second busbar, and a connection portion connecting the first busbar to the second busbar. Each of the first busbar and the second busbar has a width greater than a width of the connection portion.

In some embodiments, the fixation bracket includes: a bracket body having a cell fixation hole defined thereon, the cell fixation hole having an insertion opening adapted for an insertion of the cell; and a bottom baffle disposed on a side of the cell fixation hole opposite to the insertion opening, the bottom baffle extending from an outer peripheral edge of the cell fixation hole inwardly along a radial direction of the cell fixation hole, and the bottom baffle having a baffle groove defined on a side surface of the bottom baffle and recessing towards the insertion opening.

In some embodiments, the bottom baffle is an annular baffle and has an annular baffle rib provided at an inner peripheral edge thereof. The annular baffle has an avoidance hole defined in a center thereof and in communication with an inner side and an outer side of the cell fixation hole. The baffle groove is an annular groove surrounding the avoidance hole. The annular baffle rib faces towards the insertion opening and is adjacent to the annular groove.

In some embodiments, the battery module further includes a concentricity retaining structure configured to retain a concentricity between the cell inserted into the cell fixation hole and the cell fixation hole.

In some embodiments, the concentricity retaining structure is disposed on a wall surface of the cell fixation hole. A plurality of concentricity retaining structures is arranged at intervals in a circumferential direction of the cell fixation hole, and adapted to abut against the cell inserted into the cell fixation hole.

In some embodiments, at least two protrusion portions are disposed on a circumferential wall of the cell fixation hole. The concentricity retaining structure is a retaining protrusion protruding from a wall surface of the cell fixation hole to a height greater than a height to which each of the at least two protrusion portions protrudes from the wall surface of the cell fixation hole.

In some embodiments, the retaining protrusion is an elongated structure. An end surface of the retaining protrusion faces towards the insertion opening being a long guiding surface. Each of the at least two protrusion portions has a greater circumferential dimension than the retaining protrusion and has an end surface that faces towards the insertion opening formed into a short guiding surface. The long guiding surface has a greater dimension in an axial direction of the cell fixation hole than the short guiding surface.

In some embodiments, a distance between a starting position of the short guiding surface and the insertion opening is smaller than a distance between a starting position of the long guiding surface and the insertion opening.

In some embodiments, orthographic projection areas of the plurality of cells on a projection plane perpendicular to the plurality of cell are S1, S2, . . . , Sn, respectively. A total projection area of the plurality of cells is Stotal=S1+S2+, . . . , +Sn. An orthographic projection area of the battery module on the projection plane is Smodule. Sn and Smodule satisfy a relationship of: 60%≤Sn/Smodule≤85%.

In some embodiments, Sn and Smodule satisfy a relationship of: 65%≤Sn/Smodule≤75%.

In some embodiments, any two adjacent cells of the plurality of cells in one of the plurality of cell layers are a first cell and a second cell, respectively. Another cell layer adjacent to the one cell layer includes a third cell. The first cell, the second cell, and the third cell are arranged in a shape of a triangle. In a cross section perpendicular to the cells, a first side of the triangle is a connection line from a center of the third cell to a center of the first cell, a second side of the triangle is a connection line from the center of the third cell to a center of the second cell, and a base side of the triangle is a connection line from the center of the first cell to the center of the second cell. An included angle $\alpha$ between the first side and the base side and an included angle $\beta$ between the second side and the base side satisfy relationships of: $\alpha+\beta<180°$, $60°\leq\alpha\leq90°$ and $60°\leq\beta\leq90°$.

In some embodiments, the first side has a length A and the base side has a length B. A and B satisfy a relationship of A/B ranging from 1 to 1.1388.

According to an embodiment of the present disclosure, the power battery includes the battery module as described above.

With the power battery according to an embodiment of the present disclosure, the cell layer is formed by arranging the plurality of cells in parallel. The plurality of cell layers is laminated on each other. For every two adjacent cell layers of the plurality of cell layers, more than half the number of the explosion-proof openings in one of the two adjacent cell layers face towards the first direction, and more than half the number of the explosion-proof openings in the other one of the two adjacent cell layers face towards the second direction. The first direction is different from the second direction. Therefore, when thermal runaway occurs in a cell in one of any two adjacent cell layers, high-temperature substances ejected from the cell subjected to the thermal runaway slightly affect other cells in the other one of the two adjacent cell layers, thereby reducing a probability of damages to the other cells in the other one of the two adjacent cell layers and a probability of a chain reaction of thermal runaway among cells.

According to an embodiment of the present disclosure, the vehicle includes the power battery as described above.

With the vehicle according to an embodiment of the present disclosure, the cell layer is formed by arranging the plurality of cells in parallel. The plurality of cell layers is laminated on each other. For every two adjacent cell layers of the plurality of cell layers, more than half the number of the explosion-proof openings in one of the two adjacent cell layers face towards the first direction, and more than half the number of the explosion-proof openings in the other one of the two adjacent cell layers face towards the second direction. The first direction is different from the second direction. Therefore, when thermal runaway occurs in a cell in one of any two adjacent cell layers, high-temperature substances ejected from the cell subjected to the thermal runaway slightly affect other cells in the other one of the two adjacent cell layers, thereby reducing a probability of damages to the other cells in the other one of the two adjacent cell layers and a probability of a chain reaction of thermal runaway among cells.

Additional aspects and advantages of the present disclosure will be provided at least in part in the following description, or will become apparent at least in part from the following description, or can be learned from practicing of the present disclosure.

BRIEF DESCRIPTION OF DRAWINGS

The above and/or additional aspects and advantages of the present disclosure will become more apparent and more understandable from the description of embodiments taken in conjunction with the accompanying drawings, in which.

Figure 1:
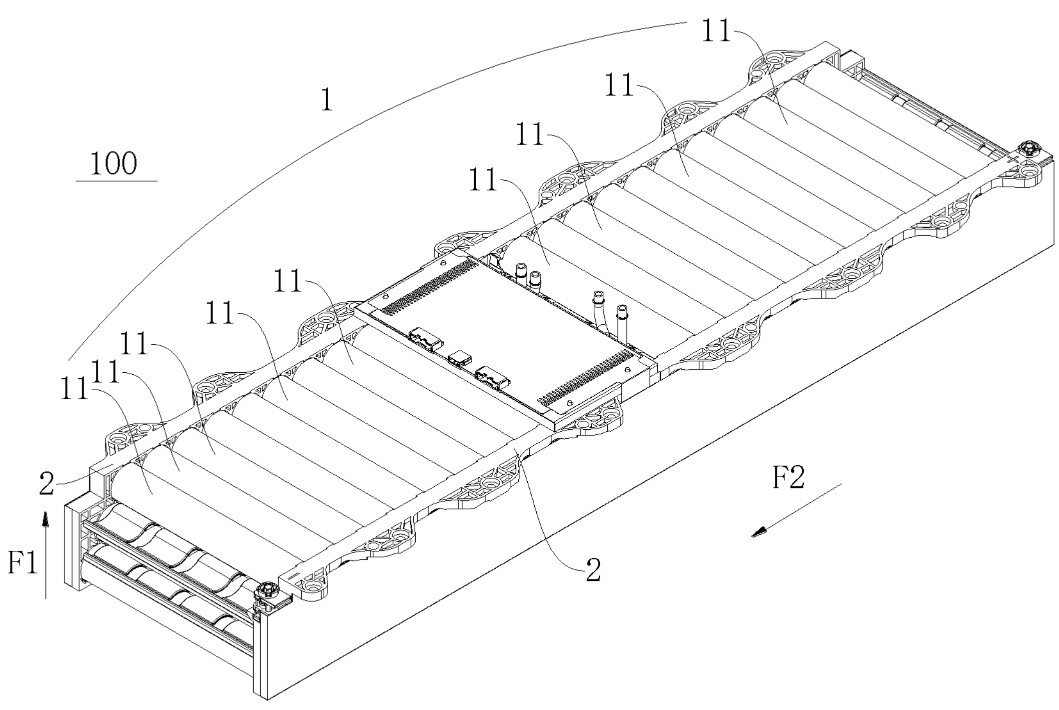
FIG. 1 is a schematic structural view of a battery module according to an embodiment of the present disclosure.

Reference numerals in the accompanying drawings:

battery module 100, cell layer 1, cell 11, explosion-proof opening 111, first cell 112, second cell 113, third cell 114, first side 115, second side 116, base side 117, fixation bracket 2, bracket body 21, cell fixation hole 211, insertion opening 2111, protrusion portion 2112, short guiding surface 21121, recessed portion 2113, bottom baffle 22, baffle groove 221, avoidance hole 222, annular baffle rib 223, connection busbar 3, first busbar 31, second busbar 32, connection portion 33, concentricity retaining structure 4, long guiding surface 41, water cooling structure 6, first direction F1, second direction F2, positive electrode A1, negative electrode A2.

DESCRIPTION OF EMBODIMENTS

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A battery module 100, a power battery, and a vehicle according to the embodiments of the present disclosure will be described below with reference to the accompanying drawings.

As illustrated in FIG. 1 to FIG. 4, the battery module 100 according to an embodiment of the present disclosure includes a plurality of cell layers 1 and a fixation bracket 2.

Figure 2:
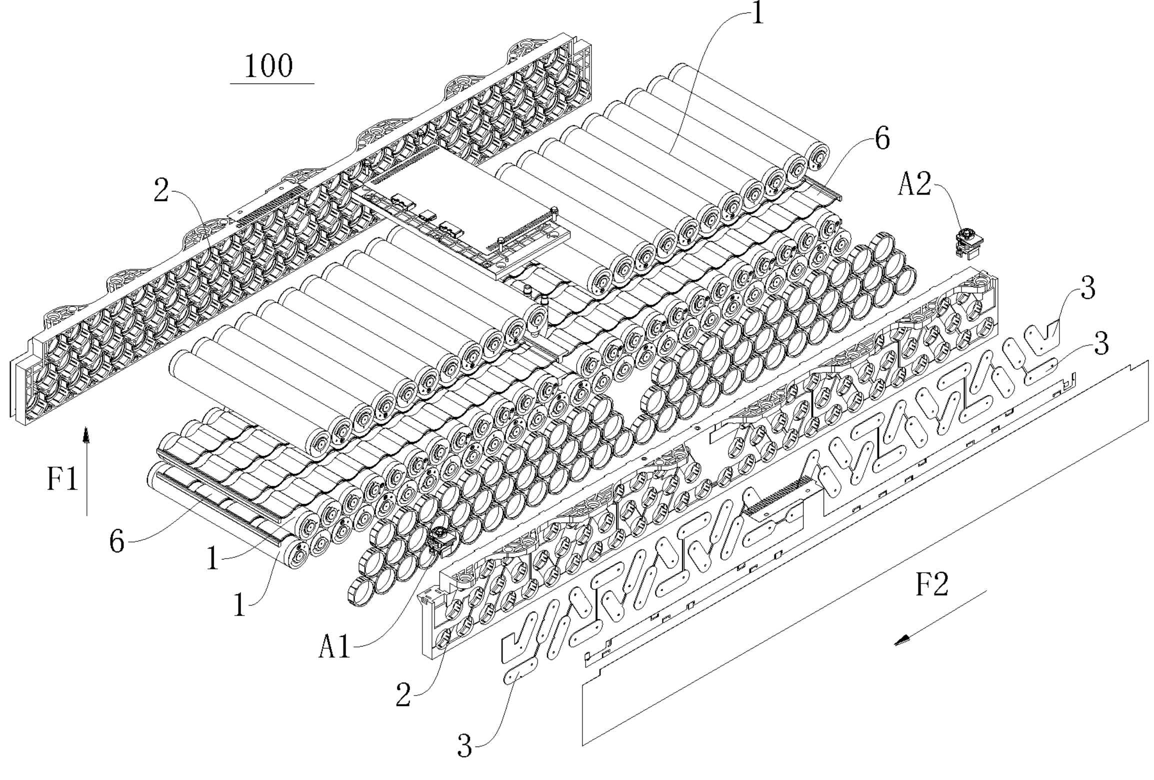
FIG. 2 is an exploded view of a battery module according to an embodiment of the present disclosure.
Figure 3:
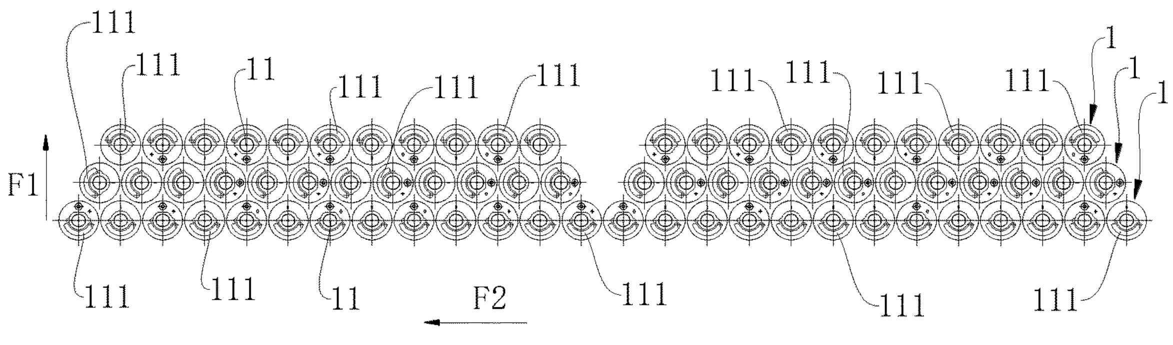
FIG. 3 is an arrangement view of a plurality of cell layers according to an embodiment of the present disclosure.
Figure 4:
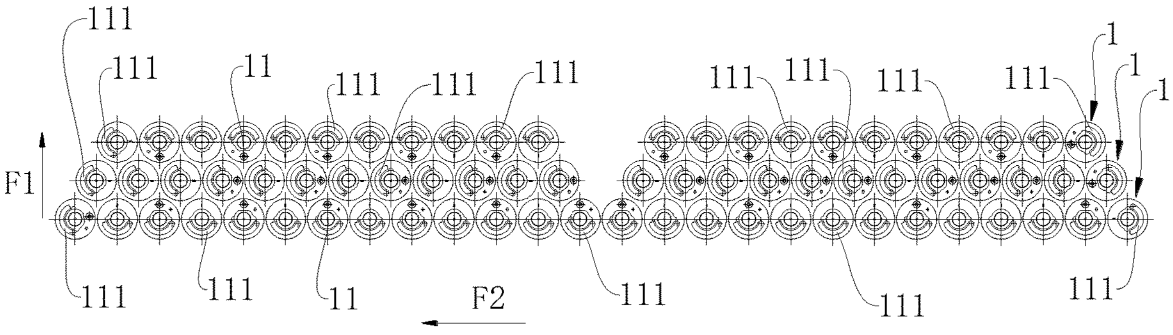
FIG. 4 is an arrangement view of a plurality of cell layers according to an embodiment of the present disclosure.

Specifically, with reference to FIG. 2 to FIG. 4, the plurality of cell layers 1 is laminated on each other. Each cell layer 1 includes a plurality of cells 11 arranged in parallel. Each cell 11 has an explosion-proof opening 111 defined thereon. For every two adjacent cell layers 1, more than half the number of the explosion-proof openings 111 in one of the two adjacent cell layers 1 face towards a first direction F1, and more than half the number of the explosion-proof openings 111 in the other one of the two adjacent cell layers 1 face towards a second direction F2. The first direction F1 is different from the second direction F2. The fixation bracket 2 is located at each of two sides of the plurality of cell layers 1. Each of both ends of each cell 11 is fixed to the fixation bracket 2 that is on a same side as the end.

It should be understood that in order to increase power of the battery module 100, the plurality of cells 11 may be provided. The plurality of cells 11 is arranged in parallel to form a cell layer 1. The plurality of cell layers 1 is laminated on each other to facilitate an arrangement of the plurality of cells 11, making the cells 11 more compact with each other. Therefore, with a limited size of the battery module 100, more cells 11 can be disposed to increase the power of the battery module 100. During an operation of the battery module 100, thermal runaway may occur in each cell 11. After the thermal runaway occurs, high-temperature substances in the cell 11 are ejected from the explosion-proof opening 111. For every two adjacent cell layers 1, more than half the number of the explosion-proof openings 111 in one of the two adjacent cell layers 1 face towards the first direction F1, and more than half the number of the explosion-proof openings 111 in the other one of the two adjacent cell layers 1 face towards the second direction F2. The first direction F1 is different from the second direction F2. Therefore, when thermal runaway occurs in the cell 11 in one of any two adjacent cell layers 1, high-temperature substances ejected from the cell 11 subjected to the thermal runaway slightly affect other cells in the other one of the two adjacent cell layers 1, thereby reducing a probability of damages to the other cells 11 in the other one of the two adjacent cell layers 1. The fixation bracket 2 may be configured for fixation of the plurality of cell layers 1, i.e., each cell 11.

In the related art, explosion-proof openings of cells of most battery modules are arranged to face towards a same direction. When thermal runaway occurs in one cell of such a battery module, high-temperature substances ejected from the explosion-proof opening of the cell may be sprayed to other cells towards which the explosion-proof opening faces. The other cells affected by the ejection also spray high-temperature substances to some other cells, resulting in a chain reaction of thermal runaway, and eventually thermal runaway of the entire battery module.

With the battery module 100 according to an embodiment of the present disclosure, the cell layer 1 is formed by arranging the plurality of cells 11 in parallel. The plurality of cell layers 1 is laminated on each other. For every two adjacent cell layers 1, more than half the number of the explosion-proof openings 111 in one of the two adjacent cell layers 1 face towards the first direction F1, and more than half the number of the explosion-proof openings 111 in the other one of the two adjacent cell layers 1 face towards the second direction F2. The first direction F1 is different from the second direction F2. Therefore, when thermal runaway occurs in the cell 11 in one of any two adjacent cell layers 1, high-temperature substances ejected from the cell 11 subjected to the thermal runaway slightly affect other cells 11 in the other one of the two adjacent cell layers 1, thereby reducing a probability of damages to the other cells 11 in the other one of the two adjacent cell layers 1 and a probability of a chain reaction of thermal runaway among cells 11.

In some embodiments of the present disclosure, as illustrated in FIG. 3 and FIG. 4, the first direction F1 is perpendicular to or opposite to the second direction F2. Therefore, when thermal runaway occurs in the cell 11 in one of any two adjacent cell layers 1, high-temperature substances ejected from the cell 11 subjected to the thermal runaway slightly affect other cells 11 in the other one of the two adjacent cell layers 1, thereby reducing a probability of damages to the other cells 11 in the other one of the two adjacent cell layers 1.

With reference to FIG. 3 and FIG. 4, according to some embodiments of the present disclosure, for every two adjacent cell layers 1, the explosion-proof openings 111, except for the explosion-proof opening 111 located at an edge, in one of the two adjacent cell layers 1 face towards the first direction F1. It should be understood that the explosion-proof opening 111 of the cell 11 located at the edge in the one of the two adjacent cell layers 1 faces towards a non-first direction. The one of the two adjacent cell layers 1 may include two edge cells 11. The explosion-proof opening 111 of one of the two edge cells 11 may face towards the first direction F1 and the explosion-proof opening 111 of the other one of the two edge cells 11 may face towards the non-first direction; or the explosion-proof openings 111 of the two edge cells 11 face towards the non-first direction F1, in which case the explosion-proof openings 111 of the two edge cells 11 may face towards a same direction or different directions.

The explosion-proof openings 111, except for the explosion-proof opening 111 located at an edge, in the other one of the two adjacent cell layers 1 face towards the second direction F2. It should be understood that the explosion-proof opening 111 of the cell 11 located at the edge in the other one of the two adjacent cell layers 1 faces towards a non-second direction. The other one of the two adjacent cell layers 1 may include two edge cells 11. The explosion-proof opening 111 of one of the two edge cells 11 may face towards the second direction F2 and the explosion-proof opening 111 of the other one of the two edge cells 11 may face towards the non-second direction F2; or the explosion-proof openings 111 of the two edge cells 11 face towards the non-second direction F2, in which case the explosion-proof openings 111 of the two edge cells 11 may face towards a same direction or different directions. Therefore, when the thermal runaway occurs in the cell 11 located at the edge, an impact of the thermal runaway on the adjacent cell 11 can be mitigated to allow a normal operation of the adjacent cell 11.

As illustrated in FIG. 3, according to some embodiments of the present disclosure, in the plurality of cell layers 1, all the explosion-proof openings 111 in an uppermost cell layer 1 face upwards; and all the explosion-proof openings 111 in a lowermost cell layer 1 face downwards. Therefore, when thermal runaway occurs in one cell 11 in the uppermost cell layer 1, high-temperature substances can neither be sprayed to other cells 11 in a same cell layer 1 nor to a lower cell layer 1, thereby mitigating an impact of the thermal runaway on other cells 11 to allow both other cells 11 in the same cell layer 1 and the lower cell layer 1 to operate normally.

Here, when the plurality of cell layers 1 includes three cell layers 1, all the explosion-proof openings 111 in a middle cell layer 1 of the three cell layers 1 face towards a left side or a right side simultaneously. Therefore, when thermal runaway occurs in one cell 11 in the middle cell layer 1, high-temperature substances are not sprayed to other cell layers, thereby mitigating an impact of the thermal runaway on the cells 11 in the other cell layers.

Alternatively, when the plurality of cell layers 1 includes four or more cell layers 1, the explosion-proof openings 111 in any two adjacent cell layers 1 of the four or more cell layers 1 other than an uppermost cell layer 1 and a lowermost cell layer 1 face towards the left side and the right side alternately. Therefore, when thermal runaway occurs in any layer of the plurality of cell layers 1, high-temperature substances are not sprayed to other cell layers 1, thereby reducing a probability of damages to the cells 11 in the other cell layers 1.

As illustrated in FIG. 4, according to some embodiments of the present disclosure, in the plurality of cell layers 1, the explosion-proof opening 111 at a leftmost end of an uppermost cell layer 1 faces towards a left side, the explosion-proof opening 111 at a rightmost end of the uppermost cell layer 1 faces towards a right side, and the explosion-proof openings 111 located between the leftmost end and the rightmost end of the uppermost cell layer face upwards; and the explosion-proof opening 111 at a leftmost end of a lowermost cell layer 1 faces towards the left side, the explosion-proof opening 111 at a rightmost end of the lowermost cell layer 1 faces towards the right side, and the explosion-proof openings 111 located between the leftmost end and the rightmost end of the lowermost cell layer face downwards. Therefore, no matter whether thermal runaway occurs in any cell 11 in the uppermost cell layer 1 or in the lowermost cell layer 1, high-temperature substances are not sprayed by the cell 11 to other cells 11, thereby mitigating an impact of the thermal runaway on the other cells 11 in the event of the thermal runaway occurred in any cell 11 in the uppermost cell layer 1 or in the lowermost cell layer 1.

As illustrated in FIG. 4, the plurality of cell layers 1 includes three cell layers 1. The explosion-proof opening 111 at a rightmost end of a middle cell layer 1 of the three cell layers 1 faces towards the right side, and the remaining explosion-proof openings 111 in the middle cell layer 1 face towards the left side. Therefore, when thermal runaway occurs in the cell 11 at the rightmost end of the middle cell layer 1, high-temperature substances are not sprayed to other cells 11 in the middle cell layer 1, thereby reducing a damage to the other cells 11 when the thermal runaway occurs in the cell 11 located at the rightmost end of the middle cell layer 1. Alternatively, the explosion-proof opening 111 at a leftmost end of the middle cell layer 1 of the three cell layers 1 faces towards the left side, and the remaining explosion-proof openings 111 in the middle cell layer 1 face towards the right side. Therefore, when thermal runaway occurs in the cell 11 at the leftmost end of the middle cell layer 1, high-temperature substances are not sprayed to other cells 11 in the middle cell layer 1, thereby reducing a damage to the other cells 11 when the thermal runaway occurs in the cell 11 located at the leftmost end of the middle cell layer 1.

Figure 5:
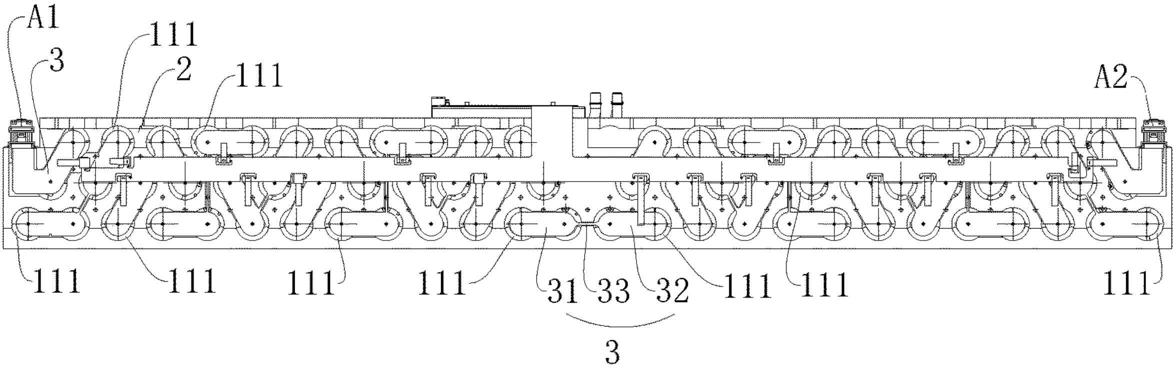
FIG. 5 is a partial schematic structural view of a battery module according to an embodiment of the present disclosure.

In some embodiments of the present disclosure, as illustrated in FIG. 5, the plurality of cells 11 is connected to each other through a connection busbar 3. The connection busbar 3 may be a conductive member connected to a positive electrode A1 and a negative electrode A2 of the battery module 100. Each of two longitudinal ends of the connection busbar 3 is in an arc shape to avoid the explosion-proof opening 111. Each of the two longitudinal ends of the connection busbar 3 has an arcuate outer diameter smaller than or equal to an arcuate inner diameter of the explosion-proof opening 111 to allow at least a part of the ends of the connection busbar 3 to fully or partially avoid the corresponding explosion-proof opening 111. Therefore, an ejection of high-temperature substances from the explosion-proof opening 111 can be facilitated in the event of thermal runaway. In addition, by allowing the connection busbar 3 to avoid the explosion-proof opening 111, a probability of melting or even a short circuit of the connection busbar 3 caused by high-temperature substances can be lowered.

With reference to FIG. 3 to FIG. 5, according to some embodiments of the present disclosure, the explosion-proof opening 111 is in an arc shape, disposed on an end surface of the cell 11, and is offset with respect to a center line of the corresponding cell 11. Therefore, the explosion-proof opening 111 in the arc shape can facilitate mutual avoidance with the connection busbar 3, reduce shielding of the connection busbar 3 to the explosion-proof opening 111, and facilitate an ejection of high-temperature substances from the explosion-proof opening 111 in the event of thermal runaway occurred in the cell 11. By allowing the explosion-proof opening 111 to be offset with respect to the center line of the corresponding cell 11, the mutual avoidance with the connection busbar 3 can be further facilitated, and the shielding of the connection busbar 3 to the explosion-proof opening 111 can be further reduced.

As illustrated in FIG. 3 to FIG. 5, in some embodiments of the present disclosure, the explosion-proof opening 111 is adjacent to an outer peripheral edge of the cell 11, and the explosion-proof opening 111 is elongated. In this way, an area of the explosion-proof opening 111 shielded by the connection busbar 3 can be reduced to facilitate the ejection of the high-temperature substances in the event of the thermal runaway.

Figure 6:
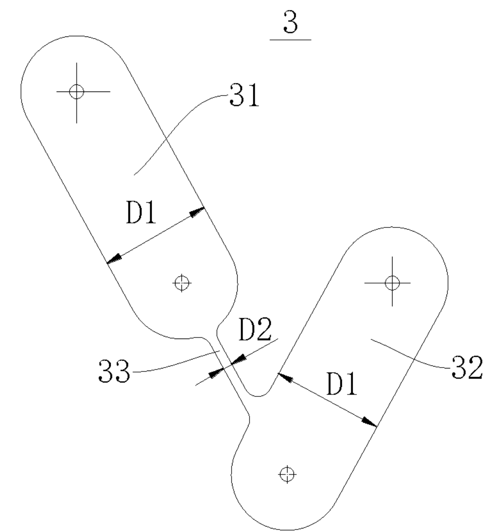
FIG. 6 is a schematic structural view of a connection busbar according to an embodiment of the present disclosure.

In some embodiments of the present disclosure, with reference to FIG. 5 and FIG. 6, the connection busbar 3 may include a first busbar 31, a second busbar 32, and a connection portion 33 connecting the first busbar 31 to the second busbar 32. Each of the first busbar 31 and the second busbar 32 has a width greater than a width of the connection portion 33. Therefore, when thermal runaway occurs or a current is too high, fusion of the connection portion 33 that is narrower than each of the first busbar 31 and the second busbar 32 can be implemented easily to prevent the short circuit. Also, when the connection busbar 3 is connected between cells 11, it is also easy for the narrower connection portion 33 to avoid other members.

A width D1 of each of the first busbar 31 and the second busbar 32 and a width D2 of the connection portion 33 may satisfy a relationship of: $1<D1/D2\leq 60$. In this way, the fusion of the connection portion 33 can be further facilitated. Further, D1 and D2 may satisfy a relationship of: $10\leq D1/D2\leq 30$. In this way, the fusion of the connection portion 33 can also be further facilitated.

With reference to FIG. 5 and FIG. 6, according to some embodiments of the present disclosure, the connection busbar 3 includes the first busbar 31, the second busbar 32, and the connection portion 33 connecting the first busbar 31 to the second busbar 32. The connection portion 33 is configured to span the explosion-proof opening 111. Therefore, when the explosion-proof opening 111 of the cell 11 corresponding to the connection busbar 3 ejects high-temperature substances in the event of thermal runaway, the fusion of the connection portion 33 can be facilitated by means of allowing the connection portion 33 to span the explosion-proof opening 111, thereby preventing the short circuit.

Figure 7:
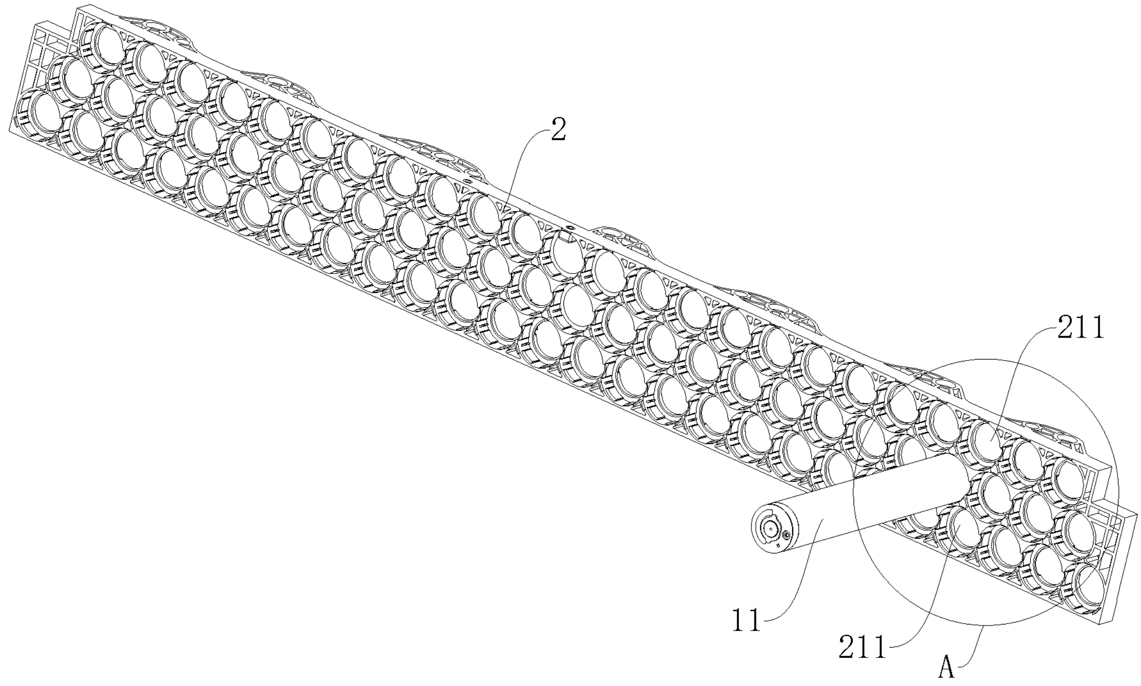
FIG. 7 is a schematic view of a cell mounting on a fixation bracket according to an embodiment of the present disclosure.
Figure 8:
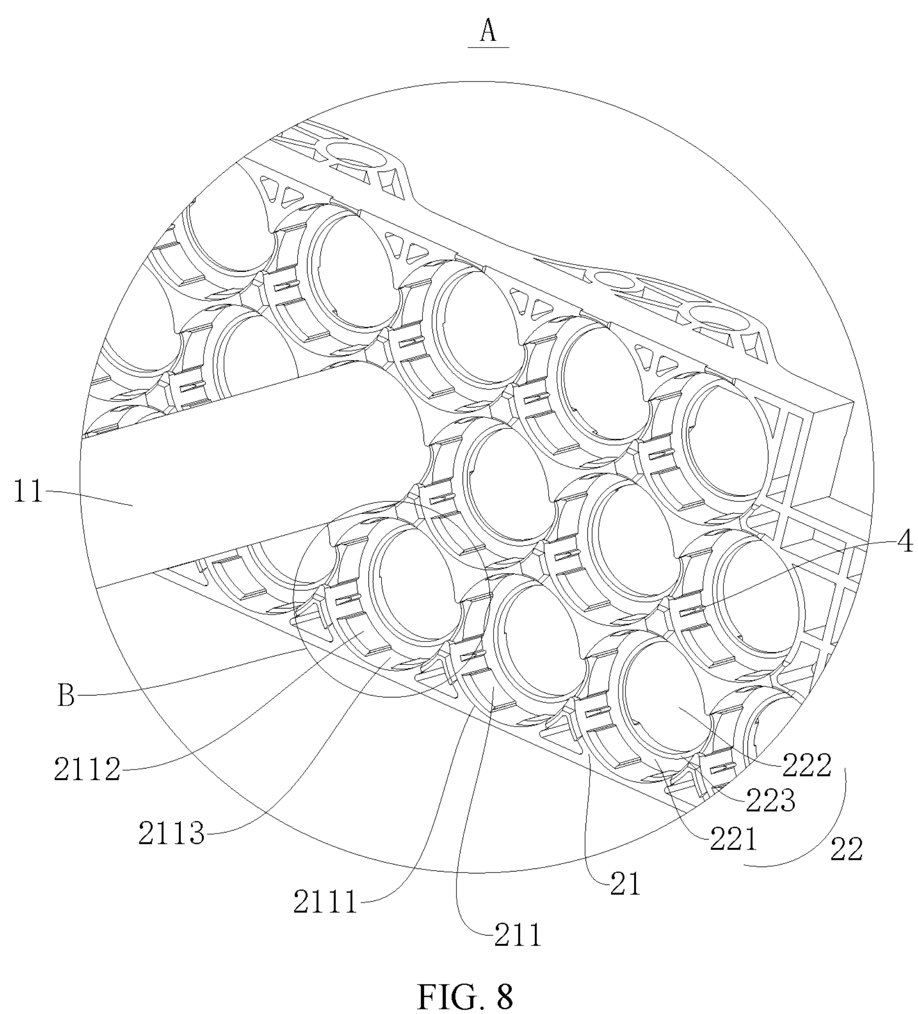
FIG. 8 is a partially enlarged view at A illustrated in FIG. 7.
Figure 9:
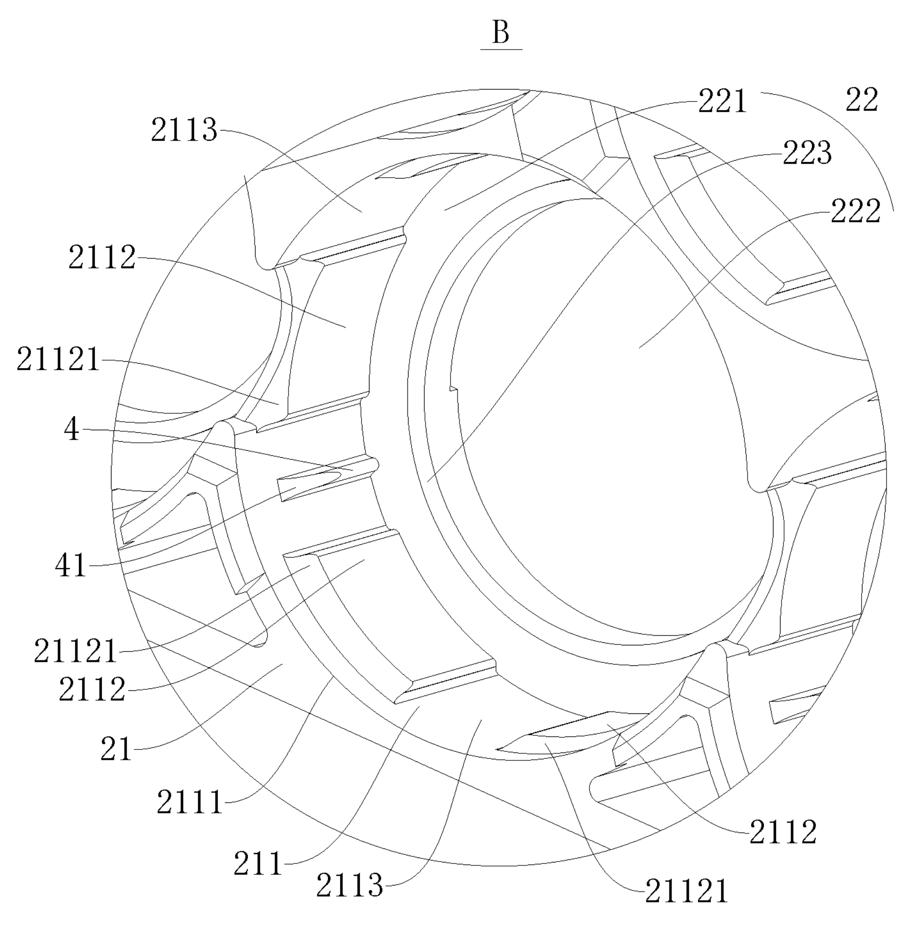
FIG. 9 is a partially enlarged view at B illustrated in FIG. 8.

As illustrated in FIG. 7 to FIG. 9, according to some embodiments of the present disclosure, the fixation bracket 2 includes a bracket body 21 and a bottom baffle 22. The bracket body 21 has a cell fixation hole 211 defined thereon. The cell fixation hole 211 has an insertion opening 2111 adapted for an insertion of the cell 11. The bottom baffle 22 is disposed on a side of the cell fixation hole 211 opposite to the insertion opening 2111. The bottom baffle 22 extends from the outer peripheral edge of the cell fixation hole 211 inwardly along a radial direction of the cell fixation hole 211. The bottom baffle 22 has a baffle groove 221 defined on a side surface of the bottom baffle 22. The side surface of the bottom baffle 22 recesses towards the insertion opening 2111. It should be understood that the cell 11 may be inserted into the cell fixation hole 211 through the insertion opening 2111. An overlapping portion between the cell 11 and the cell fixation hole 211 may be filled with a fixative glue. The fixative glue may bond the cell 11 to a circumferential wall of the cell fixation hole 211 to reliably fix the cell 11 in the cell fixation hole 211. The bottom baffle 22 may prevent at least part of the fixative glue from flowing out from the side of the cell fixation hole 211 opposite to the insertion opening 2111. The baffle groove 221 may store the fixative glue. In this way, a part of the cell 11 opposite to the baffle groove 221 may also be fixed by the fixative glue, thereby further strengthening secure mounting of the cell 11. Moreover, the baffle groove 221 may limit a position of the fixative glue to further prevent the fixative glue from flowing out from the side of the cell fixation hole 211 opposite to the insertion opening 2111.

In some embodiments of the present disclosure, as illustrated in FIG. 9, the bottom baffle 22 is an annular baffle. The annular baffle has an avoidance hole 222 defined in a center of the annular baffle. The avoidance hole 222 is in communication with an inner side and an outer side of the cell fixation hole 211. It should be noted that two ends of the cell 11 need to be connected to the connection busbar 3 that may be the conductive member connected to the positive electrode A1 and the negative electrode A2 of the battery module 100. The cell 11 may be connected to the connection busbar 3 through the avoidance hole 222 to form a loop with the positive electrode A1 and the negative electrode A2 of the battery module 100.

As illustrated in FIG. 9, the baffle groove 221 is an annular groove. The annular groove surrounds the avoidance hole 222. In this way, the fixative glue may be stored in the annular groove to restrain or even prevent the fixative glue from overflowing the avoidance hole 222. By allowing the annular groove to surround the avoidance hole 222, an arrangement of the baffle groove 221 can be facilitated, and as much fixative glue as possible can be prevented from overflowing the avoidance hole 222. Further, as illustrated in FIG. 9, the bottom baffle 22 has an annular baffle rib 223 provided at an inner peripheral edge of the bottom baffle 22. The annular baffle rib 223 faces towards the insertion opening 2111 and is adjacent to the annular groove. Therefore, the annular baffle groove 221 may be defined by the annular baffle rib 223 and an inner circumferential wall of the cell fixation hole 211 to facilitate formation of the baffle groove 221.

In some embodiments of the present disclosure, as illustrated in FIG. 9, the fixation bracket 2 further includes a concentricity retaining structure 4. The concentricity retaining structure 4 is configured to retain a concentricity between the cell 11 inserted into the cell fixation hole 211 and the cell fixation hole 211. As a possible implementation, the concentricity retaining structure 4 may be disposed on a wall surface of the cell fixation hole 211; and a plurality of concentricity retaining structures 4 is arranged at intervals in a circumferential direction of the cell fixation hole 211, and adapted to abut against the cell 11 inserted into the cell fixation hole 211. Therefore, the concentricity retaining structures 4 may limit a position of the cell 11 and fix the cell 11 to a center position of the cell fixation hole 211. In this way, the cell 11 may retain concentricity with the cell fixation hole 211. The concentricity between the cell 11 and the cell fixation hole 211 can facilitate mounting and fixation of the cell 11 and a connection between the cell 11 and the connection busbar 3.

As illustrated in FIG. 9, in some embodiments of the present disclosure, at least two protrusion portions 2112 are disposed on a circumferential wall of the cell fixation hole 211. A recessed portion 2113 may be formed between any two adjacent protrusion portions 2112. By disposing the at least two protrusion portions 2112 on the circumferential wall of the cell fixation hole 211, formation of the recessed portion 2113 between any two adjacent protrusion portions 2112 can be facilitated. Since the fixative glue needs to fill between the cell 11 and the cell fixation hole 211, the recessed portion 2113 can facilitate an arrangement of the fixative glue in the cell fixation hole 211 to limit a position of the fixative glue. Therefore, as little fixative glue as possible may flow out of the cell fixation hole 211.

For example, the at least two protrusion portions 2112 and the cell 11 that is inserted into the cell fixation hole 211 may be in clearance fit. In this case, the recessed portion 2113 and the cell 11 that is inserted into the cell fixation hole 211 may also be in clearance fit. The clearance fit between the cell 11 and the at least two protrusion portions 2112 and between the cell 11 and the recessed portion 2113 can facilitate filling of the fixative glue between the cell 11 and the cell fixation hole 211. The concentricity retaining structure 4 is a retaining protrusion. The retaining protrusion protrudes from a wall surface of the cell fixation hole 211 to a height greater than a height to which each of the at least two protrusion portions 2112 protrudes from the wall surface of the cell fixation hole 211. In this way, smooth filling of the fixative glue can be ensured. Therefore, while the cell 11 is reliably adhered to the cell fixation hole 211, the retaining protrusion can position the cell 11 to fix the cell 11 to the center position of the cell fixation hole 211, thereby allowing the cell 11 to retain concentricity with the cell fixation hole 211. The concentricity between the cell 11 and the cell fixation hole 211 can facilitate the mounting and fixation of the cell 11 and the connection between the cell 11 and the connection busbar 3.

According to some embodiments of the present disclosure, with reference to FIG. 9, the retaining protrusion is an elongated structure, and each of the at least two protrusion portions 2112 has a greater circumferential dimension than the retaining protrusion. In this way, as little part of the retaining protrusion as possible can be in contact with the cell 11, thereby allowing the fixative glue to be applied to more area of the cell 11 while the cell 11 can be positioned by the retaining protrusion. Therefore, the cell 11 can be more firmly adhered to the cell fixation hole 211.

As illustrated in FIG. 9, an end surface of the retaining protrusion facing towards the insertion opening 2111 is a long guiding surface 41, and an end surface of each of the at least two protrusion portions 2112 faces towards the insertion opening 2111 and is formed into a short guiding surface 21121. The long guiding surface 41 has a greater dimension in an axial direction of the cell fixation hole 211 than the short guiding surface 21121. It should be understood that both the long guiding surface 41 and the short guiding surface 21121 can provide guidance for the cell 11 inserted into the cell fixation hole 211, to facilitate insertion of the cell 11 into the cell fixation hole 211. Since the retaining protrusion protrudes from the wall surface of the cell fixation hole 211 to the height greater than the height to which each of the at least two protrusion portions 2112 protrudes from the wall surface of the cell fixation hole 211, the retaining protrusion is always in contact with the cell 11 after the cell 11 is inserted into the cell fixation hole 211. Since a gap is defined between each of the at least two protrusion portions 2112 and the cell 11, the short guiding surface 21121 only needs to guide the cell 11 into the cell fixation hole 211, and the long guiding surface 41 needs to guide contact and mounting of the cell 11 with the retaining protrusion. By allowing the long guiding surface 41 to have a greater dimension than the short guiding surface 21121, processing steps and difficulty can be reduced with ease of use.

According to some embodiments of the present disclosure, with reference to FIG. 9, a distance between a starting position of the short guiding surface 21121 and the insertion opening 2111 is smaller than a distance between a starting position of the long guiding surface 41 and the insertion opening 2111. In this way, during mounting of the cell 11 with the cell fixation hole 211, the short guiding surface 21121 may guide the cell 11 into the cell fixation hole 211, and the long guiding surface 41 may guide the cell 11 until the cell 11 is abutted against the retaining protrusion. Therefore, cooperation between the long guiding surface 41 and the short guiding surface 21121 can allow smooth mounting of the cell 11 into the cell fixation hole 211. In addition, a volume of the retaining protrusion can be reduced to decrease a contact area between the retaining protrusion and the cell 11, in which case the fixative glue can be applied to more area of the cell 11 while the cell 11 can be positioned by the retaining protrusion, thereby allowing the cell 11 to be more firmly adhered to the cell fixation hole 211.

According to some embodiments of the present disclosure, as illustrated in FIG. 2 and FIG. 3, orthographic projection areas of the plurality of cells 11 on a projection plane perpendicular to the plurality of cells 11 are S1, S2, . . . , Sn, respectively; and a total projection area of the plurality of cells 11 is Stotal=S1+S2+, . . . , +Sn, and an orthographic projection area of the battery module 100 on the projection plane is Smodule. Sn and Smodule satisfy a relationship of: 60%≤Sn/Smodule≤85%. Therefore, in a limited space volume of the battery module 100, more cells 11 may be disposed within the battery module 100 to increase the power of the battery module 100. In some embodiments, Sn and Smodule satisfy a relationship of: 65%≤Sn/Smodule≤75%. In this manner, as many cells 11 as possible can be disposed within a limited volume of the battery module 100 to increase the power of the battery module 100.

Figure 10:
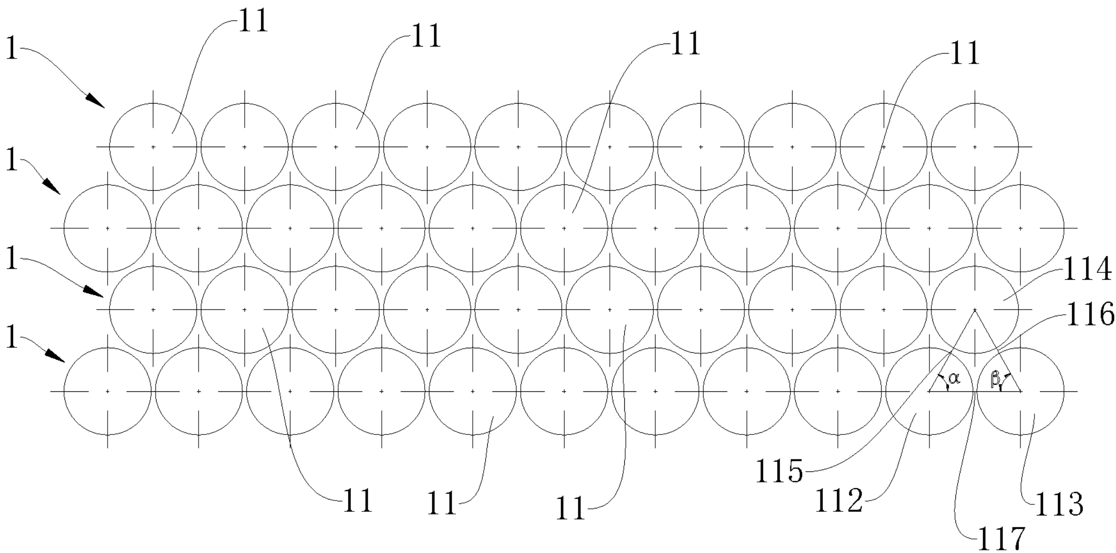
FIG. 10 is an arrangement view of a plurality of cell layers according to an embodiment of the present disclosure.

As illustrated in FIG. 2 and FIG. 10, in some embodiments of the present disclosure, any two adjacent cells 11 of the plurality of cells 11 in one of the plurality of cell layers 1 are a first cell 112 and a second cell 113, respectively; and another cell layer 11 adjacent to the one cell layer 1 includes a third cell 114. The first cell 112, the second cell 113, and the third cell 114 are arranged in a shape of a triangle. In a cross section perpendicular to the cells, a first side 115 of the triangle is a connection line from a center of the third cell 114 to a center of the first cell 112, a second side 116 of the triangle is a connection line from the center of the third cell 114 to a center of the second cell 113, and a base side 117 of the triangle is a connection line from the center of the first cell 112 to the center of the second cell 113. An included angle $\alpha$ between the first side 115 and the base side 117 and an included angle $\beta$ between the second side 116 and the base side 117 satisfy relationships of: $\alpha+\beta\leq 180°$, $60°\leq\alpha\leq 90°$ and $60°\leq\beta\leq 90°$.

It can be understood that the plurality of cell layers 1 provides good compatibility to the battery module 100. Arranging the first cell 112, the second cell 113, and the third cell 114 in the shape of the triangle makes an arrangement of each cell 11 more stable and reliable. An angle arrangement satisfying the relationships of: $\alpha+\beta\leq 180°$, $60°\leq\alpha\leq 90°$ and $60°\leq\beta\leq 90°$ can improve space utilization of the battery module 100. For example, a water cooling structure 6 may be disposed between every two cell layers 1. The angle arrangement satisfying the relationships of: $\alpha+\beta<180°$, $60°\leq\alpha\leq 90°$ and $60°\leq\beta\leq 90°$ can facilitate an arrangement of the water cooling structure 6 or a phase change material, etc., in a gap between cells 11.

In some embodiments of the present disclosure, the first side 115 has a length A and the base side 117 has a length B. A and B satisfy a relationship of A/B ranging from 1 to 1.1388. In this way, the space utilization of the battery module 100 can be improved.

According to an embodiment of the present disclosure, a power battery includes the battery module as described above.

With the power battery according to an embodiment of the present disclosure, the cell layer 1 is formed by arranging the plurality of cells 11 in parallel. The plurality of cell layers 1 is laminated on each other. For every two adjacent cell layers 1 of the plurality of cell layers 1, more than half the number of the explosion-proof openings 111 in one of the two adjacent cell layers 1 face towards the first direction F1, and more than half the number of the explosion-proof openings 111 in the other one of the two adjacent cell layers 1 face towards the second direction F2. The first direction F1 is different from the second direction F2. Therefore, when thermal runaway occurs in the cell 11 in one of any two adjacent cell layers 1, high-temperature substances ejected from the cell 11 subjected to the thermal runaway slightly affect other cells 11 in the other one of the two adjacent cell layers 1, thereby reducing a probability of damages to the other cells 11 in the other one of the two adjacent cell layers 1 and a probability of a chain reaction of thermal runaway among cells 11.

According to an embodiment of the present disclosure, a vehicle includes the power battery as described above.

With the vehicle according to an embodiment of the present disclosure, the cell layer 1 is formed by arranging the plurality of cells 11 in parallel. The plurality of cell layers 1 is laminated on each other. For every two adjacent cell layers 1 of the plurality of cell layers 1, more than half the number of the explosion-proof openings 111 in one of the two adjacent cell layers 1 face towards the first direction F1, and more than half the number of the explosion-proof openings 111 in the other one of the two adjacent cell layers 1 face towards the second direction F2. The first direction F1 is different from the second direction F2. Therefore, when thermal runaway occurs in the cell 11 in one of any two adjacent cell layers 1, high-temperature substances ejected from the cell 11 subjected to the thermal runaway slightly affect other cells 11 in the other one of the two adjacent cell layers 1, thereby reducing a probability of damages to the other cells 11 in the other one of the two adjacent cell layers 1 and a probability of a chain reaction of thermal runaway among cells 11.

In the description of the present disclosure, it should be understood that, the orientation or position relationship indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc., is based on the orientation or position relationship shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation on the present disclosure. Furthermore, feature limited with "first", "second" may expressly or implicitly include one or more of the feature. In the description of the present disclosure, "plurality" means at least two, unless otherwise specified.

In the present disclosure, it should be noted that, unless otherwise clearly specified and limited, terms such as "install", "connect", "connect to" and the like should be understood in a broad sense. For example, it may be a fixed connection or a detachable connection or connection as one piece; a mechanical connection or an electrical connection; a direct connection or an indirect connection through an intermediate; or internal communication of two components. For those skilled in the art, the specific meaning of the above-mentioned terms in the present disclosure can be understood according to specific circumstances.

In the description of this specification, descriptions with reference to the terms "an embodiment", "some embodiments", "exemplary embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although embodiments of the present disclosure have been illustrated and described, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. A battery module, comprising:

a plurality of cell layers laminated on each other, each of the plurality of cell layers comprising a plurality of cells arranged in parallel, and each of the plurality of cells having an explosion-proof opening defined thereon, wherein for every two adjacent cell layers of the plurality of cell layers, more than half the number of the explosion-proof openings in one of the two adjacent cell layers face towards a first direction, and more than half the number of the explosion-proof openings in the other one of the two adjacent cell layers face towards a second direction, the first direction being different from the second direction; and a fixation bracket located at each of two sides of the plurality of cell layers, wherein each of both ends of each of the plurality of cells is fixed to the fixation bracket that is on a same side as the end, wherein for every two adjacent cell layers, the explosion-proof openings, except for the explosion-proof opening located at an edge, in one of the two adjacent cell layers face towards the first direction; and the explosion-proof openings, except for the explosion-proof opening located at an edge, in the other one of the two adjacent cell layers face towards the second direction.

2. The battery module according to claim 1, wherein the first direction is perpendicular to or opposite to the second direction.

3. A battery module, comprising:

a plurality of cell layers laminated on each other, each of the plurality of cell layers comprising a plurality of cells arranged in parallel, and each of the plurality of cells having an explosion-proof opening defined thereon, wherein for every two adjacent cell layers of the plurality of cell layers, more than half the number of the explosion-proof openings in one of the two adjacent cell layers face towards a first direction, and more than half the number of the explosion-proof openings in the other one of the two adjacent cell layers face towards a second direction, the first direction being different from the second direction; and a fixation bracket located at each of two sides of the plurality of cell layers, wherein each of both ends of each of the plurality of cells is fixed to the fixation bracket that is on a same side as the end, wherein:

in the plurality of cell layers, all the explosion-proof openings in an uppermost cell layer face upwards; and all the explosion-proof openings in a lowermost cell layer face downwards; and when the plurality of cell layers comprises three cell layers, all the explosion-proof openings in a middle cell layer of the three cell layers face towards a left side or a right side simultaneously; or when the plurality of cell layers comprises four or more cell layers, the explosion-proof openings in any two adjacent cell layers of the four or more cell layers other than an uppermost cell layer and a lowermost cell layer face towards the left side and the right side alternately.

4. A battery module, comprising:

a plurality of cell layers laminated on each other, each of the plurality of cell layers comprising a plurality of cells arranged in parallel, and each of the plurality of cells having an explosion-proof opening defined thereon, wherein for every two adjacent cell layers of the plurality of cell layers, more than half the number of the explosion-proof openings in one of the two adjacent cell layers face towards a first direction, and more than half the number of the explosion-proof openings in the other one of the two adjacent cell layers face towards a second direction, the first direction being different from the second direction; and a fixation bracket located at each of two sides of the plurality of cell layers, wherein each of both ends of each of the plurality of cells is fixed to the fixation bracket that is on a same side as the end, wherein:

in the plurality of cell layers, the explosion-proof opening at a leftmost end of an uppermost cell layer faces towards a left side, the explosion-proof opening at a rightmost end of the uppermost cell layer faces towards a right side, and the explosion-proof openings located between the leftmost end and the rightmost end of the uppermost cell layer face upwards; and the explosion-proof opening at a leftmost end of a lowermost cell layer faces towards the left side, the explosion-proof opening at a rightmost end of the lowermost cell layer faces towards the right side, and the explosion-proof openings located between the leftmost end and the rightmost end of the lowermost cell layer face downwards; and when the plurality of cell layers comprises three cell layers, the explosion-proof opening at a rightmost end of a middle cell layer of the three cell layers faces towards the right side, and the remaining explosion-proof openings in the middle cell layer face towards the left side; or the explosion-proof opening at a leftmost end of the middle cell layer of the three cell layers faces towards the left side, and the remaining explosion-proof openings in the middle cell layer face towards the right side.

5. The battery module according to claim 1, wherein the explosion-proof opening is in an arc shape, disposed on an end surface of the cell, and is offset with respect to a center line of the corresponding cell.

6. The battery module according to claim 5, wherein the plurality of cells is connected to each other through a connection busbar, each of two longitudinal ends of the connection busbar is in an arc shape to avoid the explosion-proof opening; and each of the two longitudinal ends of the connection busbar has an arcuate outer diameter smaller than or equal to an arcuate inner diameter of the explosion-proof opening to allow at least a part of the ends of the connection busbar to fully or partially avoid the corresponding explosion-proof opening.

7. The battery module according to claim 6, wherein the connection busbar comprises a first busbar, a second busbar, and a connection portion connecting the first busbar to the second busbar, each of the first busbar and the second busbar having a width greater than a width of the connection portion.

8. The battery module according to claim 1, wherein the fixation bracket comprises:

a bracket body having a cell fixation hole defined thereon, the cell fixation hole having an insertion opening adapted for an insertion of the cell; and a bottom baffle disposed on a side of the cell fixation hole opposite to the insertion opening, the bottom baffle extending from an outer peripheral edge of the cell fixation hole inwardly along a radial direction of the cell fixation hole, and the bottom baffle having a baffle groove defined on a side surface of the bottom baffle and recessing towards the insertion opening.

9. The battery module according to claim 8, wherein:

the bottom baffle is an annular baffle and has an annular baffle rib provided at an inner peripheral edge thereof;

the annular baffle has an avoidance hole defined in a center thereof and in communication with an inner side and an outer side of the cell fixation hole;

the baffle groove is an annular groove surrounding the avoidance hole; and the annular baffle rib faces towards the insertion opening and is adjacent to the annular groove.

10. The battery module according to claim 8, further comprising a concentricity retaining structure configured to retain a concentricity between the cell inserted into the cell fixation hole and the cell fixation hole.

11. The battery module according to claim 10, wherein:

the concentricity retaining structure is disposed on a wall surface of the cell fixation hole; and a plurality of concentricity retaining structures is arranged at intervals in a circumferential direction of the cell fixation hole, and adapted to abut against the cell inserted into the cell fixation hole.

12. The battery module according to claim 10, wherein:

at least two protrusion portions are disposed on a circumferential wall of the cell fixation hole; and the concentricity retaining structure is a retaining protrusion protruding from a wall surface of the cell fixation hole to a height greater than a height to which each of the at least two protrusion portions protrudes from the wall surface of the cell fixation hole.

13. The battery module according to claim 12, wherein:

the retaining protrusion is an elongated structure, an end surface of the retaining protrusion facing towards the insertion opening being a long guiding surface;

each of the at least two protrusion portions has a greater circumferential dimension than the retaining protrusion and has an end surface that faces towards the insertion opening formed into a short guiding surface; and the long guiding surface has a greater dimension in an axial direction of the cell fixation hole than the short guiding surface.

14. The battery module according to claim 13, wherein a distance between a starting position of the short guiding surface and the insertion opening is smaller than a distance between a starting position of the long guiding surface and the insertion opening.

15. The battery module according to claim 1, wherein:

orthographic projection areas of the plurality of cells on a projection plane perpendicular to the plurality of cells are S1, S2, . . . , Sn, respectively; and a total projection area of the plurality of cells is Stotal=S1+S2+, . . . , +Sn, an orthographic projection area of the battery module on the projection plane is Smodule, and Sn and Smodule satisfy a relationship of: 60%≤Sn/Smodule≤85%.

16. The battery module according to claim 15, wherein Sn and Smodule satisfy a relationship of: 65%≤Sn/Smodule≤75%.

17. The battery module according to claim 1, wherein:

any two adjacent cells of the plurality of cells in one of the plurality of cell layers are a first cell and a second cell, respectively;

another cell layer adjacent to the one cell layer comprises a third cell;

the first cell, the second cell, and the third cell are arranged in a shape of a triangle, wherein in a cross section perpendicular to the cells, a first side of the triangle is a connection line from a center of the third cell to a center of the first cell, a second side of the triangle is a connection line from the center of the third cell to a center of the second cell, and a base side of the triangle is a connection line from the center of the first cell to the center of the second cell; and an included angle $\alpha$ between the first side and the base side and an included angle $\beta$ between the second side and the base side satisfy relationships of: $\alpha+\beta<180°$, $60°\leq\alpha\leq90°$ and $60°\leq\beta\leq90°$, wherein the first side has a length A and the base side has a length B, A and B satisfying a relationship of A/B ranging from 1 to 1.1388.

18. A power battery, comprising the battery module according to claim 1.

19. A vehicle, comprising the power battery according to claim 18.

* * * * *